United States Patent [19]

Hollon, Jr.

[11] Patent Number: 5,768,164
[45] Date of Patent: Jun. 16, 1998

[54] SPONTANEOUS USE DISPLAY FOR A COMPUTING SYSTEM

[75] Inventor: Richard Hollon, Jr., Corvallis, Oreg.

[73] Assignee: Hewlett-Packard Company, Palo Alto, Calif.

[21] Appl. No.: 632,212

[22] Filed: Apr. 15, 1996

[51] Int. Cl.[6] .................... G06F 1/16; G06F 3/14
[52] U.S. Cl. .................. 364/710.14; 364/708.1; 361/686
[58] Field of Search ............ 364/710.14, 708.1, 364/705.1, 705.05, 705.06; 361/679, 683, 686

[56] References Cited

U.S. PATENT DOCUMENTS

| | | | |
|---|---|---|---|
| 4,739,316 | 4/1988 | Yamaguchi et al. | 340/711 |
| 4,796,008 | 1/1989 | Haneda | 340/711 |
| 4,926,365 | 5/1990 | Hsieh | 364/708.1 |
| 5,189,632 | 2/1993 | Paajanen et al. | 364/705.05 |
| 5,224,060 | 6/1993 | Ma | 364/708.1 |
| 5,233,502 | 8/1993 | Beatty et al. | 361/729 |
| 5,255,214 | 10/1993 | Ma | 364/708.1 |
| 5,283,862 | 2/1994 | Lund | 395/155 |
| 5,333,116 | 7/1994 | Hawkins et al. | 364/708.1 |
| 5,410,497 | 4/1995 | Viletto | 364/708.1 |
| 5,619,395 | 4/1997 | McBride | 361/683 |
| 5,644,516 | 7/1997 | Podwalney et al. | 364/708.1 |

FOREIGN PATENT DOCUMENTS

| | | | |
|---|---|---|---|
| 0 564 092 A2 | 2/1993 | European Pat. Off. | G06F 1/16 |
| 67367 B | 3/1996 | Ireland | G06F 15/02 |
| 05053991 | 3/1993 | Japan | G06F 15/02 |

*Primary Examiner*—David H. Malzahn

[57] ABSTRACT

A first application running on a portable computer is accessible even when a cover of the portable computer is closed. This is done by providing a spontaneous use display on the cover of the portable computer. The spontaneous use display is visible to a user even when the portable computer is closed. A first subset of pixels within the primary display for the portable computer is mapped to the spontaneous use display. For example, the first subset of pixels within the primary display are located in a first rectangular region of the primary display.

18 Claims, 9 Drawing Sheets

SPONTANEOUS USE DISPLAY FOR A COMPUTING SYSTEM

BACKGROUND

The present invention concerns computing devices and pertains particularly to a spontaneous use display for a computing system such as a portable computer.

Users of portable computers (such as notebook computers or laptop computers) seldom rely exclusively on their personal computer for all of their personal information management (PIM). PIM generally includes appointments, to-do lists, telephone books. The low usage rate of portable computers for PIM is variously caused.

One reason some users do not use portable computers for PIM is that personal computers are too awkward to use everywhere for simple spontaneous tasks, such as glancing at the day's schedule or looking up a phone number. The display and keyboard are hidden when the computer is being carried. Users do not want to wait for the personal computer to boot up. There have been attempts to make portable computers less awkward for spontaneous tasks. For example, some vendors have implemented "instant on" of portable computers. This is done, for example, using a "sleep" or "hibernation" mode. However, often when in "sleep" or "hibernation" mode, the portable computer uses battery power at a high rate, which can make it unacceptable to leave the portable computer in such a mode for long periods of time.

Some of the above described weaknesses of portable computers have been addressed by the development of personal digital assistants (PDAs) or personal organizers. PDAs and personal organizers are relatively small and are generally designed to provide some ability to capture casual information. However, because they do not have a full-sized keyboard or display, they are not significantly limited for input/output of significant amounts of information. Additionally, PDAs and personal organizers have generally been poorly integrated with personal computers and desktop computers in such a way that information may be simply and naturally shared.

SUMMARY OF THE INVENTION

In accordance with the preferred embodiment of the present invention, a first application running on a portable computer is accessible even when a cover of the portable computer is closed. This is done by providing a spontaneous use display on the cover of the portable computer.

The spontaneous use display is visible to a user even when the portable computer is closed. A first subset of pixels within the primary display for the portable computer is mapped to the spontaneous use display. For example, the first subset of pixels within the primary display are located in a first rectangular region of the primary display.

In the preferred embodiment of the present invention, a first set of function keys are visible when the portable computer is open and are available to the user when the user uses the primary display. In addition, a second set of function keys are placed on the cover of the portable computer. The second set of function keys are available to the user when the user uses the spontaneous use display. The second set of function keys are mapped to the same functionality as the first set of function keys.

When the primary display is active and the portable computer is open, a window of the first application is displayed by the primary display. When the portable com-

2 puter is closed and the spontaneous use display is active, the window of the first application is displayed in the spontaneous use display. The first application is, for example, an alarm application, an appointment calendar application or a phone book application, a spooler application and/or shows current status of the portable computer.

The present invention allows a user to quickly access limited functions and information of a portable computer without opening the cover or using the mouse or keyboard.

DESCRIPTION OF THE PREFERRED EMBODIMENT

Figure 1:
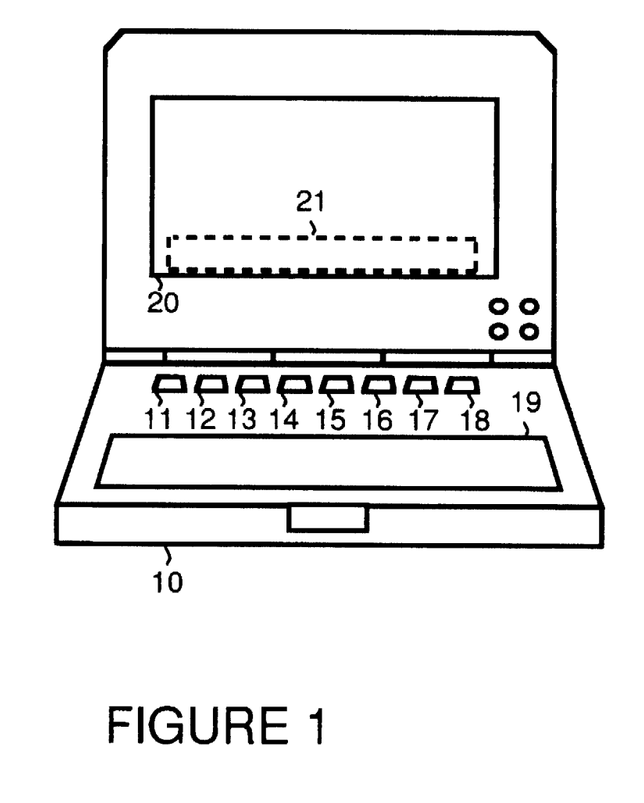
FIG. 1 shows a portable computer which includes a keyboard, a display and function keys.

FIG. 1 shows a portable computer 10 which is, for example, a laptop computer or a notebook computer. Portable computer 10 includes a keyboard 19 and a display 20. Portable computer 10 also includes function keys 11, 12, 13, 14, 15, 16, 17 and 18. Function keys 11 through 18 are variously used for input to application programs which run on portable computer 10. Display 20 is, for example a liquid crystal display (LCD). When portable computer 10 is in the open position, as shown in FIG. 1, display 20, keyboard 19 and function keys 11 through 18 are available for use by a user.

Portable computer 10 also is provides computing functionality to a user even when the cover is closed. Particularly, pixels within a section 21 of display 20 are mapped to a spontaneous use display, on the cover of portable computer 10 as further described below.

Figure 2:
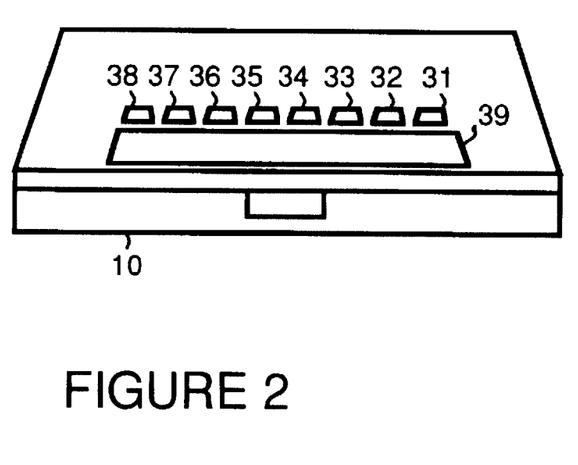
FIG. 2 shows a spontaneous use display placed on the cover of the portable computer shown in FIG. 1 in accordance with a preferred embodiment of the present invention.

Specifically, FIG. 2 shows portable computer 10 in the closed position. On the cover of portable computer 10 is a spontaneous use display 39. In FIG. 2, the orientation of display 39 is upside down. Spontaneous use display 39 is, for example a liquid crystal display (LCD). Pixels within section 21 of display 20 (shown in FIG. 1) are mapped to spontaneous use display 39, so that when portable computer 10 is in the closed position, the user can still interact with an application program run by portable computer 10. In addition, spontaneous use function keys 31, 32, 33, 34, 35, 36, 37 and 38 are active when spontaneous use display 39 is active. Spontaneous use function keys 31 through 38 are respectively mapped to the functionality of function keys 11 through 18 when spontaneous use display 39 is active.

When a user of portable computer 10 desires to utilize a particular application program on spontaneous use display 39, the user locates the active window of the application program at section 21 of display 20 (shown in FIG. 1). The user then puts portable computer 10 into an inactive mode and closes the cover. Pressing any of spontaneous use function keys 31 through 38 activates spontaneous use display 39.

Figure 3:
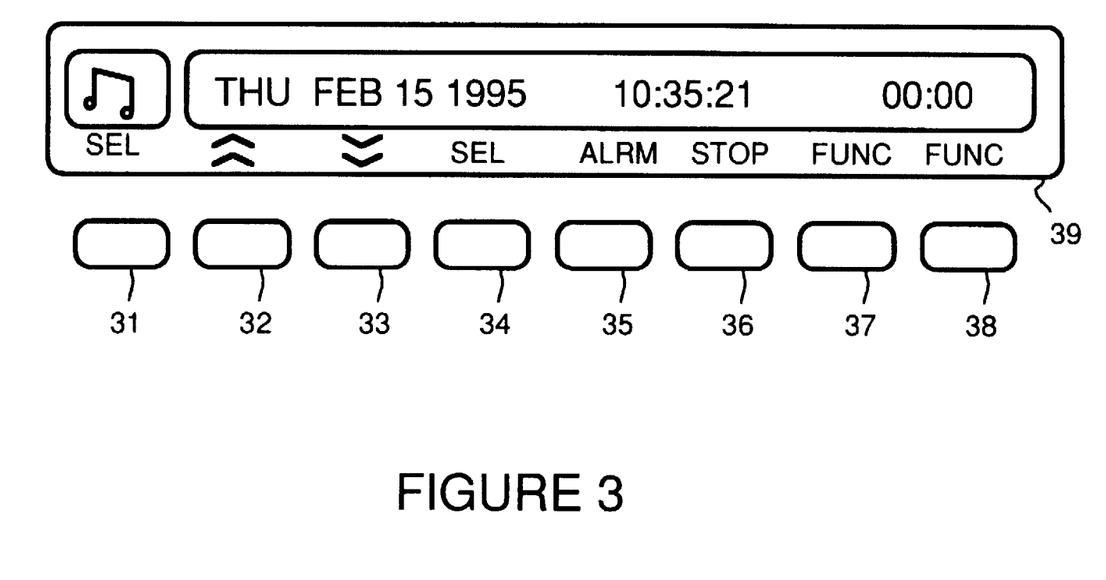
FIG. 3, FIG. 4, FIG. 5, FIG. 6 and FIG. 7 show examples of the operation application programs which utilize the spontaneous use display shown in FIG. 2, in accordance with a preferred embodiment of the present invention.
Figure 4:
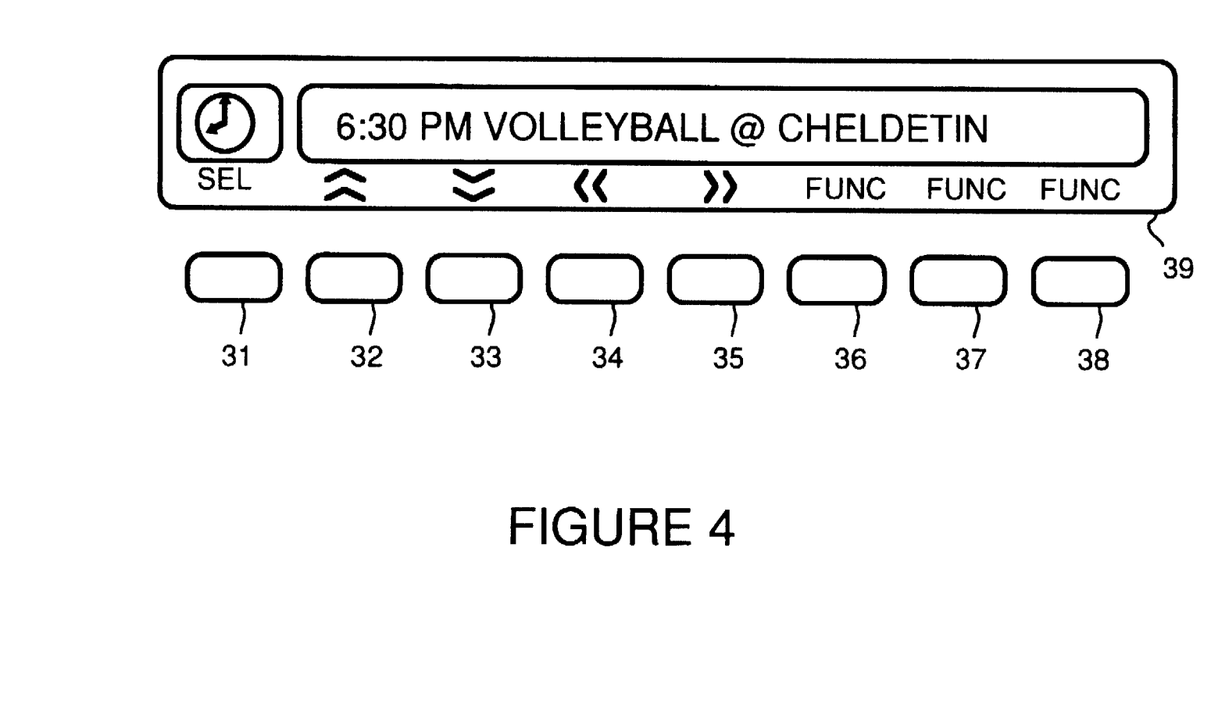
Figure 5:
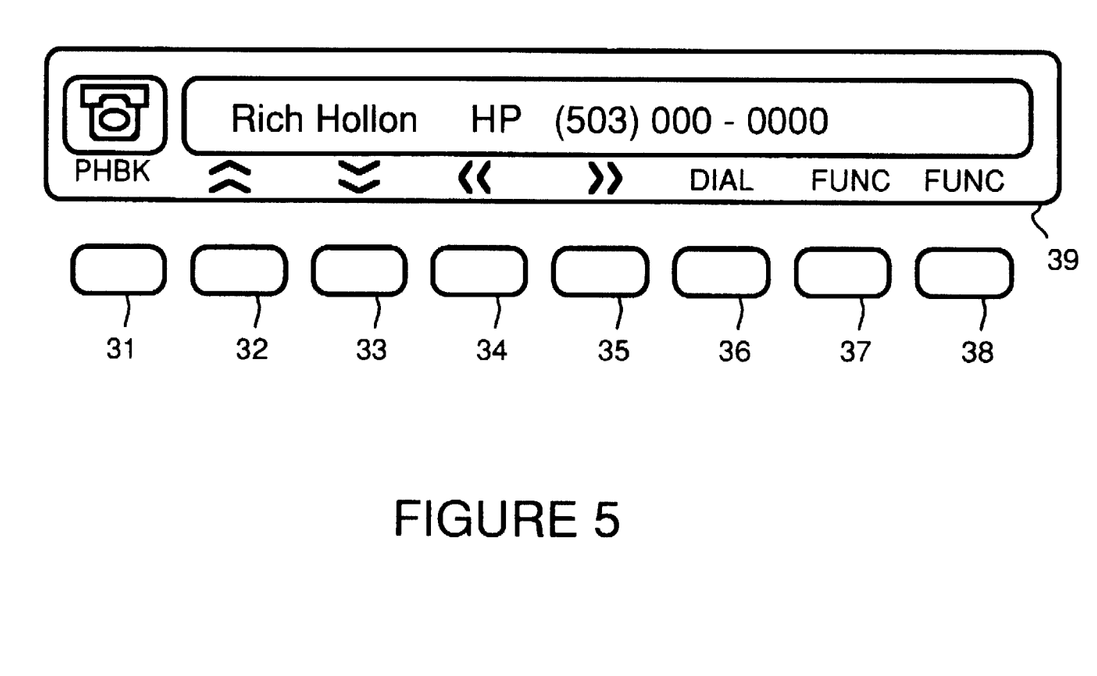
Figure 6:
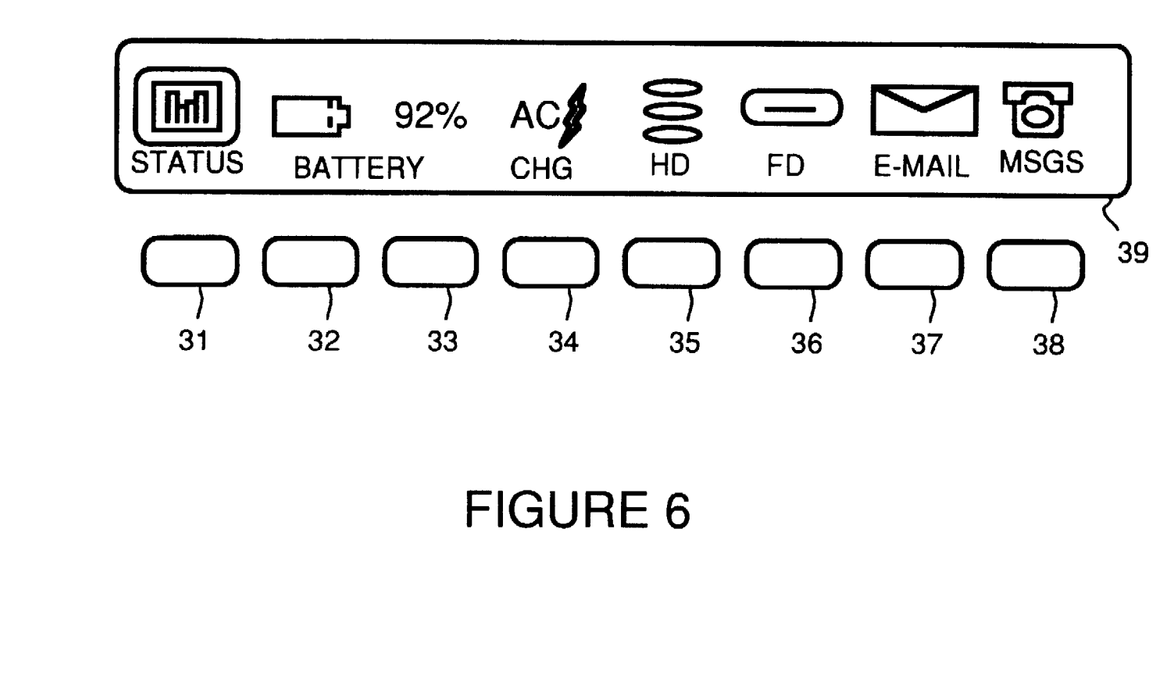
Figure 7:
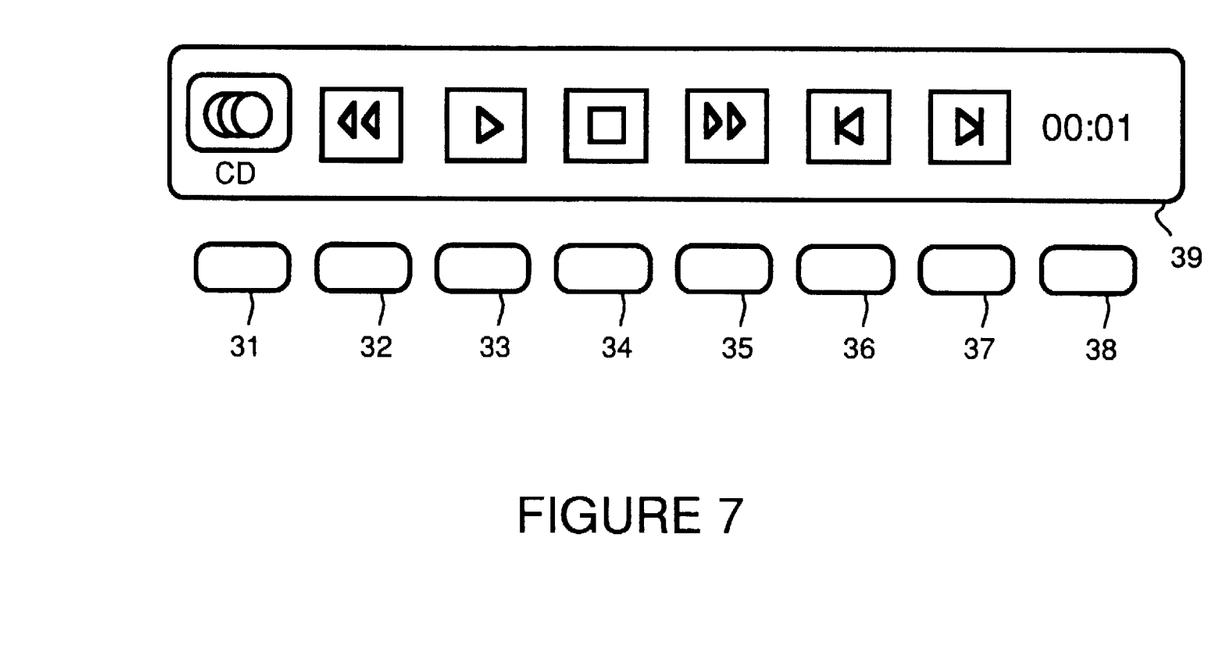

FIGS. 3 through 7 illustrate various applications which may be used with spontaneous use display 39. In FIGS. 3 through 7, the orientation of display 39 is right side up. FIG. 3, for example, shows a window for a clock/alarm/stopwatch application shown on spontaneous use display 39. FIG. 4 shows a window for an appointment calendar application shown on spontaneous use display 39. FIG. 5 shows a window for a phone book application shown on spontaneous use display 39. FIG. 6 shows on spontaneous use display 39 a window for an application which reports current status of portable computer 10. FIG. 7 shows on spontaneous use display 39 a window for a CD player application.

Additional applications which may utilize spontaneous use display include a one-way or two-way pager, a video recorder control, an audio recorder control, a (print, fax, e-mail and/or voice mail) spooler, and so on.

Figure 8:
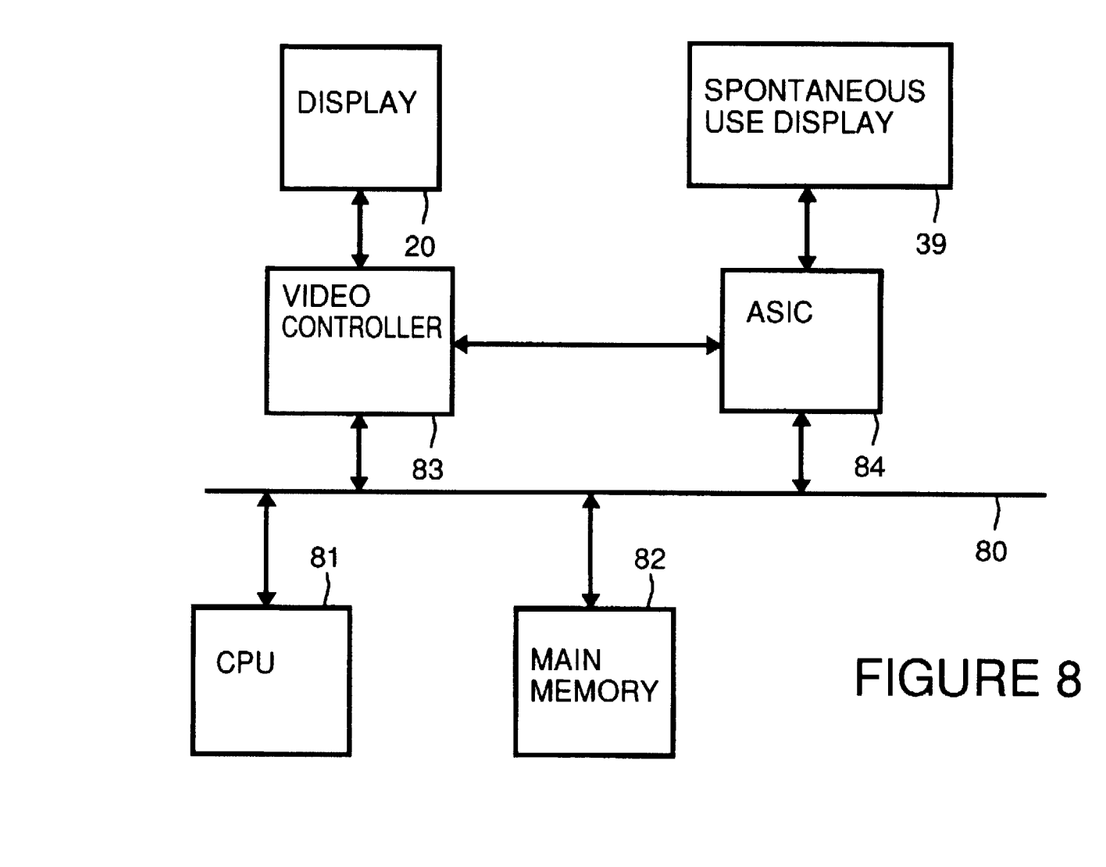
FIG. 8 is a block diagram which describes physical implementation of the spontaneous use display shown in FIG. 2, in accordance with a preferred embodiment of the present invention.

FIG. 8 is a simplified block diagram of portable computer 10 which shows how pixels within section 21 of display 20 are mapped to spontaneous use display 39. Portable computer 10 includes a central processing unit (CPU) 81 and a main memory 82, connected to a system bus 80, as shown. For example, CPU 81 is a example, a Pentium processor, a P-6 processor, or some other processor. Information on the Pentium processor, the P-6 processor and their respective host busses are available from Intel Corporation, having a business address of 2200 Mission College Boulevard, Santa Clara, Calif. 95050.

As shown in FIG. 8, display 20 is controlled by a video controller 83 connected to system bus 80. Spontaneous use display 39 is controlled by an application specific integrated circuit (ASIC) 84. ASIC 84 coordinates with video control 83 so that pixels within section 21 of display 20 are mapped to spontaneous use display 39. ASIC 84 allows the location of section 21 on display 20 to change in response to software.

Figure 9:
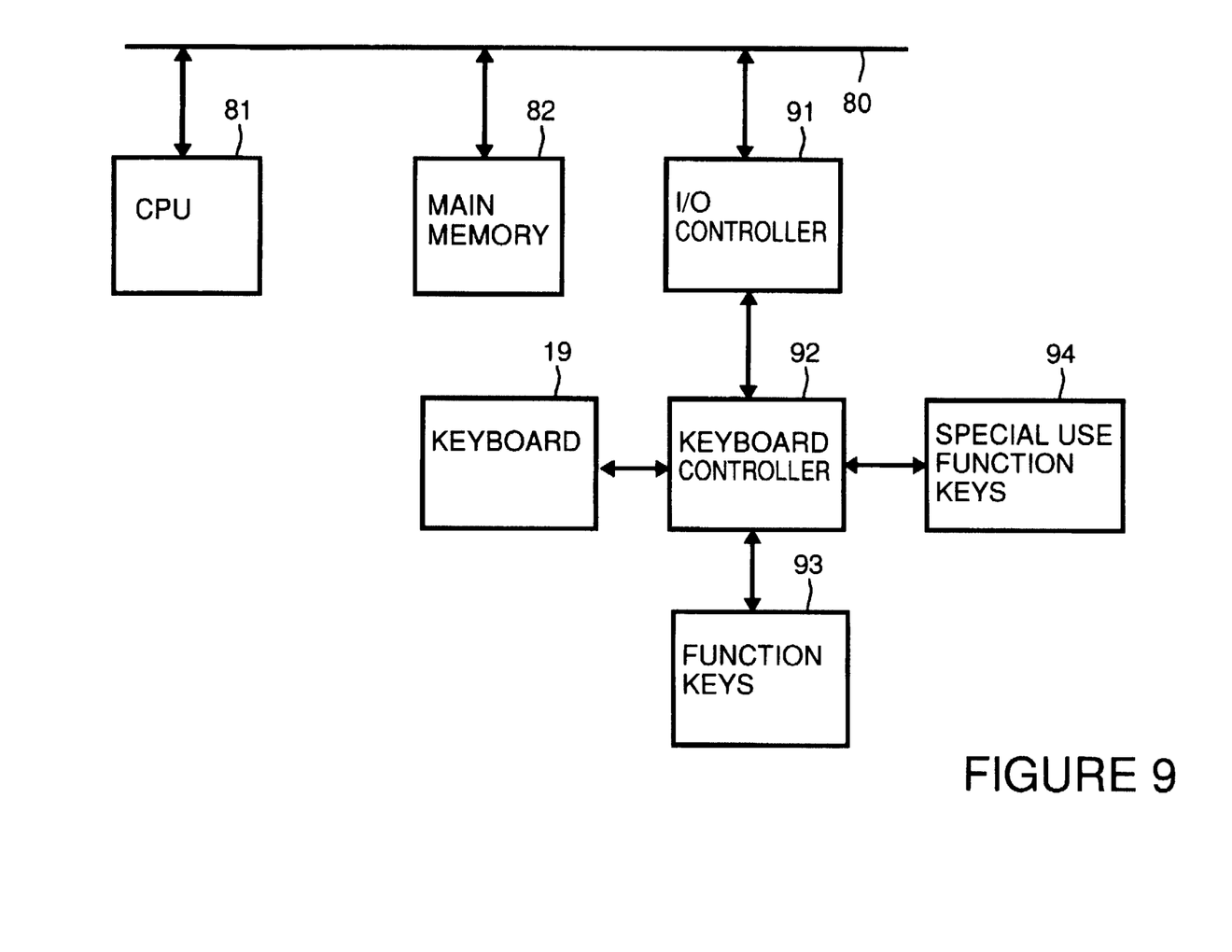
FIG. 9 is a block diagram which describes physical implementation of the spontaneous use function keys used with the spontaneous use display shown in FIG. 2, in accordance with a preferred embodiment of the present invention.

FIG. 9 is a simplified block diagram of portable computer 10 which shows how spontaneous use function keys 31 through 38 are respectively mapped to the functionality of function keys 11 through 18 when spontaneous use display 39 is active. FIG. 9 shows CPU 81 and main memory 82, connected to system bus 80, as shown. For simplicity of explanation, display 20, video controller 83, spontaneous use display 39 and ASIC 84 are not shown in FIG. 9.

As shown in FIG. 9, a keyboard controller 92 is connected to system bus 80 through an input/output (I/O) controller 91. Keyboard controller 92 receives input from keyboard 19, function keys 93 and spontaneous use function keys 94. Function keys 93 consist of function keys 11 through 18 and spontaneous use function keys 94 consist of spontaneous use function keys 31 through 38. Keyboard controller 92 respectively maps spontaneous use function keys 31 through 38 to function keys 11 through 18.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for providing access to a first application running on a portable computer when a cover of the portable computer is in a closed position, comprising the steps of:

(a) providing a spontaneous use display on a cover of the portable computer, the spontaneous use display being visible to a user when the portable computer is in the closed position; and, (b) mapping to the spontaneous use display, a first subset of pixels within a primary display, the primary display being visible to a user when the portable computer is in an open position.

2. A method as in claim 1 additionally comprising the following steps:

(c) providing a first set of function keys which are visible when the portable computer is in an open position and which are available to the user when the user uses the primary display;

(d) providing a second set of function keys placed on the cover of the portable computer, the second set of function keys being available to the user when the user uses the spontaneous use display; and, (e) mapping the second set of function keys to a same functionality as the first set of function keys.

3. A method as in claim 1 wherein in step (b) the first subset of pixels within the primary display are located in a first rectangular region of the primary display.

4. A method as in claim 1 wherein step (b) includes the following substep:

(b.1) displaying in the primary display a window of the first application when the primary display is active and the portable computer is in an open position; and, (b.2) displaying in the spontaneous use display the window of the first application when the portable computer is in the closed position and the spontaneous use display is active.

5. A method as in claim 1 wherein the first application is an alarm application.

6. A method as in claim 1 wherein the first application is an appointment calendar application.

7. A method as in claim 1 wherein the first application is a phone book application.

8. A method as in claim 1 wherein the first application shows current status of the portable computer.

9. A method as in claim 1 wherein the first application is a spooler application.

10. A portable computer comprising:

a primary display; and a second display placed on a cover of the portable computer, the second display being visible to a user when the portable computer is in a closed position;

wherein a first subset of pixels within the primary display are mapped to the second display.

11. A portable computer as in claim 10 additionally comprising:

a first set of function keys which are visible when the portable computer is in an open position and which are available to the user when the user uses the primary display; and a second set of function keys placed on the cover of the portable computer, the second set of function keys being available to the user when the user uses the second display;

wherein the second set of function keys are mapped to a same functionality as the first set of function keys.

12. A portable computer as in claim 10 wherein the first subset of pixels within the primary display are located in a first rectangular region of the primary display.

13. A portable computer as in claim 12 wherein when the portable computer is in the closed position and the second display is active, a window of a first application, which is displayed in the first rectangular region when the primary display is active and the portable computer is in an open position, is displayed in the second display.

14. A portable computer as in claim 13 wherein the first application is an alarm application.

15. A portable computer as in claim 13 wherein the first application is an appointment calendar application.

16. A portable computer as in claim 13 wherein the first application is a phone book application.

17. A portable computer as in claim 13 wherein the first application shows current status of the portable computer.

18. A portable computer as in claim 13 wherein the first application is a spooler application.

* * * * *